Jan. 11, 1949.  R. S. KOPS  2,458,712
CONVERTIBLE FOUNDATION GARMENT
Filed June 26, 1948  7 Sheets-Sheet 1
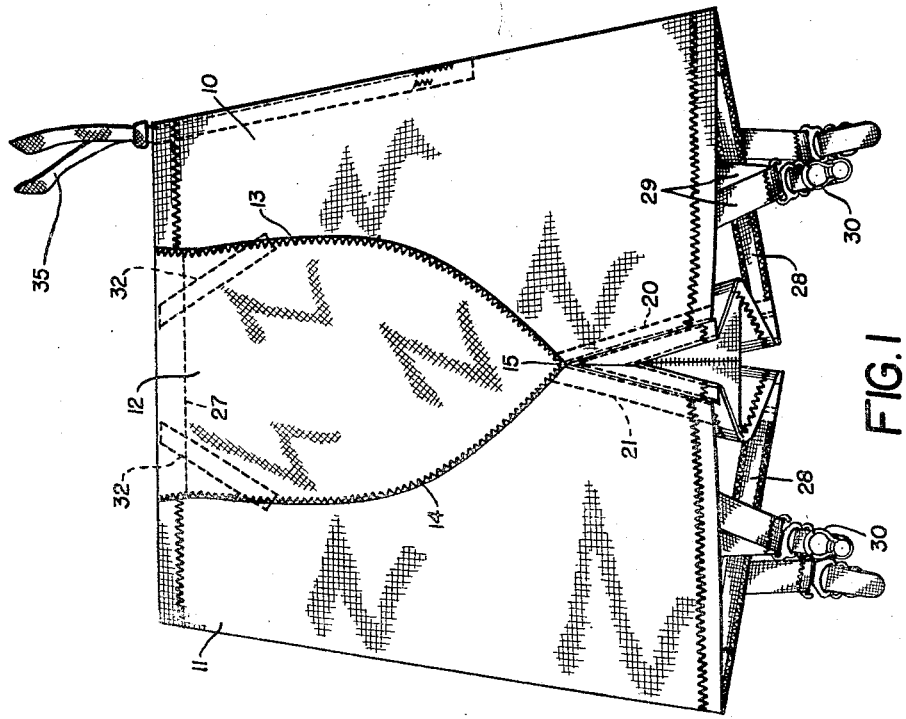
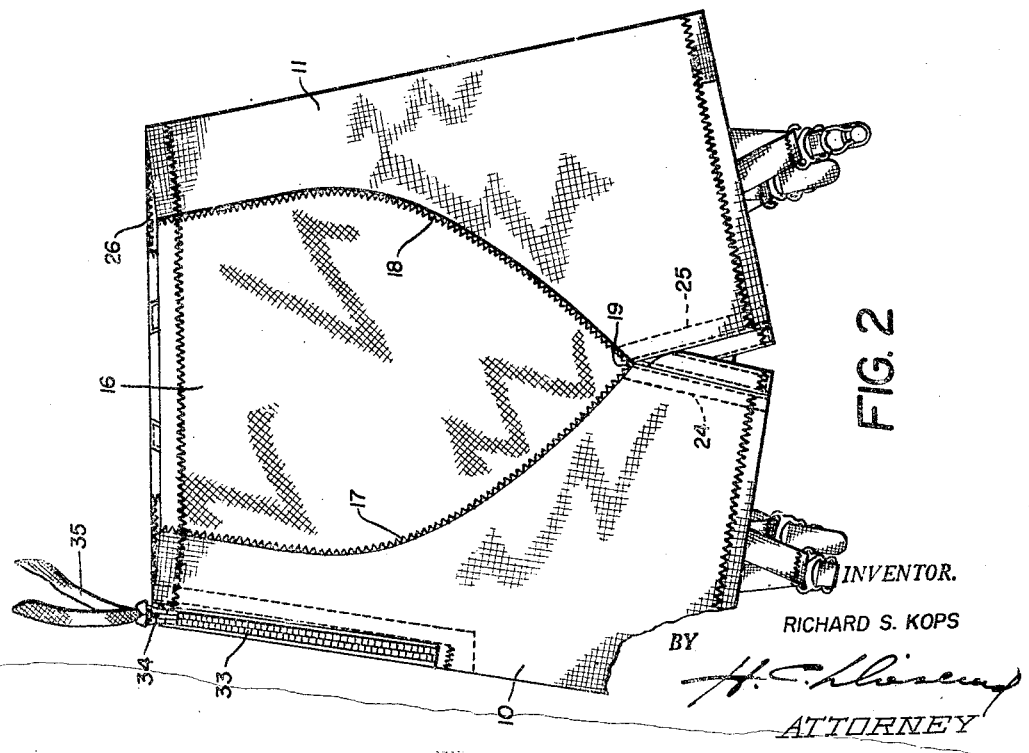
INVENTOR.
RICHARD S. KOPS
BY
ATTORNEY Jan. 11, 1949. R. S. KOPS 2,458,712
CONVERTIBLE FOUNDATION GARMENT
Filed June 26, 1948 7 Sheets-Sheet 2
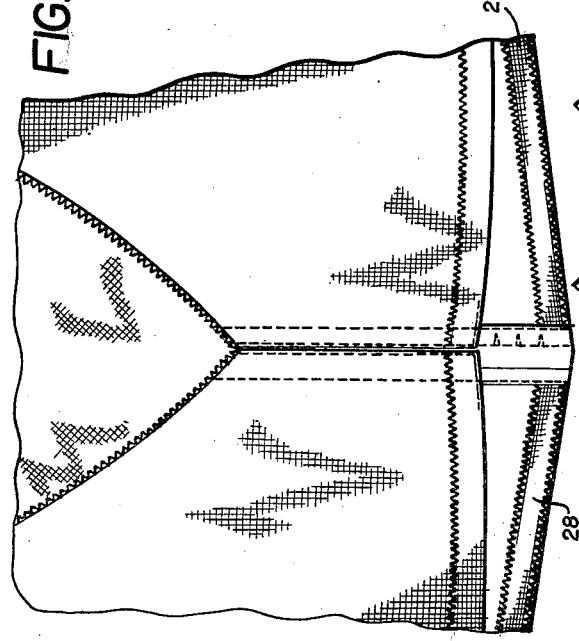
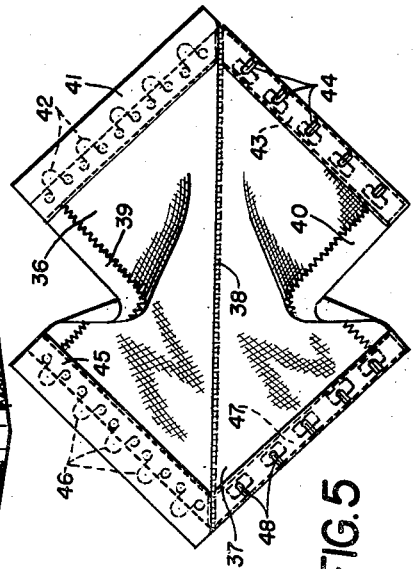
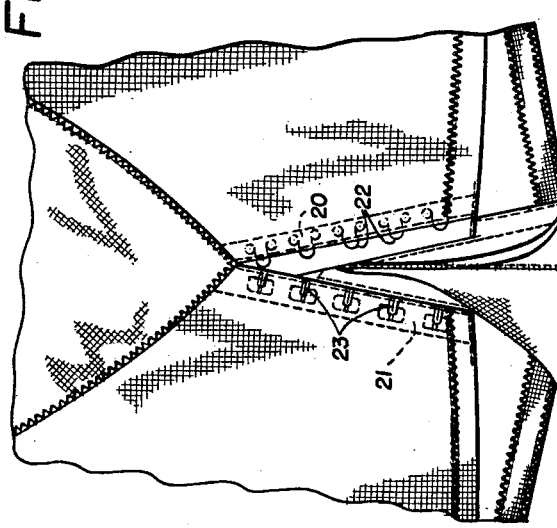
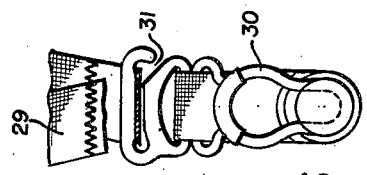
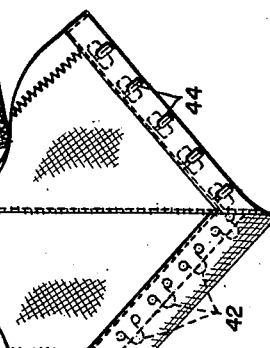
INVENTOR.
RICHARD S. KOPS
ATTORNEY Jan. 11, 1949. R. S. KOPS 2,458,712
CONVERTIBLE FOUNDATION GARMENT
Filed June 26, 1948 7 Sheets-Sheet 3

INVENTOR.
RICHARD S. KOPS
BY
ATTORNEY

Jan. 11, 1949.  R. S. KOPS  2,458,712
CONVERTIBLE FOUNDATION GARMENT
Filed June 26, 1948  7 Sheets-Sheet 4

INVENTOR.
RICHARD S. KOPS
BY
ATTORNEY

Jan. 11, 1949. R. S. KOPS 2,458,712
CONVERTIBLE FOUNDATION GARMENT
Filed June 26, 1948 7 Sheets-Sheet 5
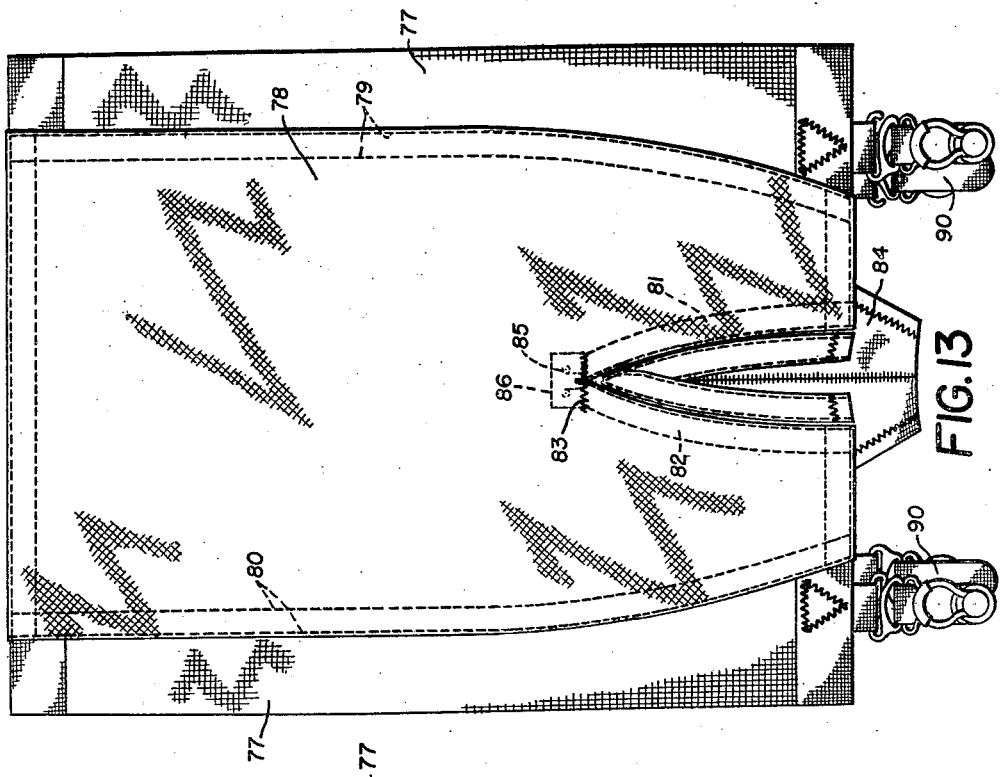
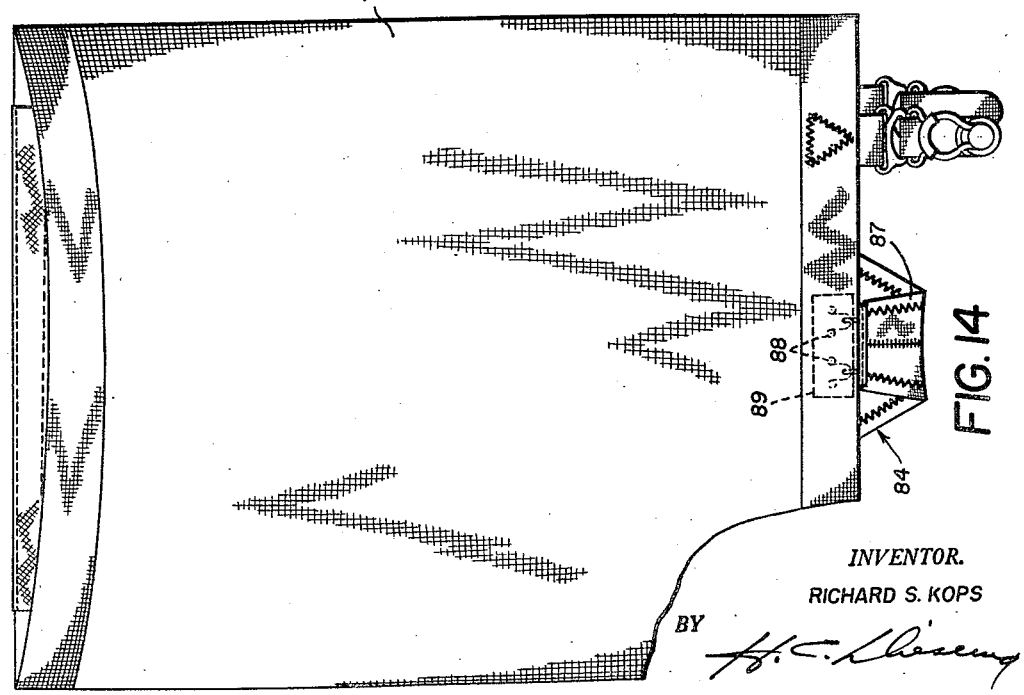
INVENTOR.
RICHARD S. KOPS
BY
ATTORNEY

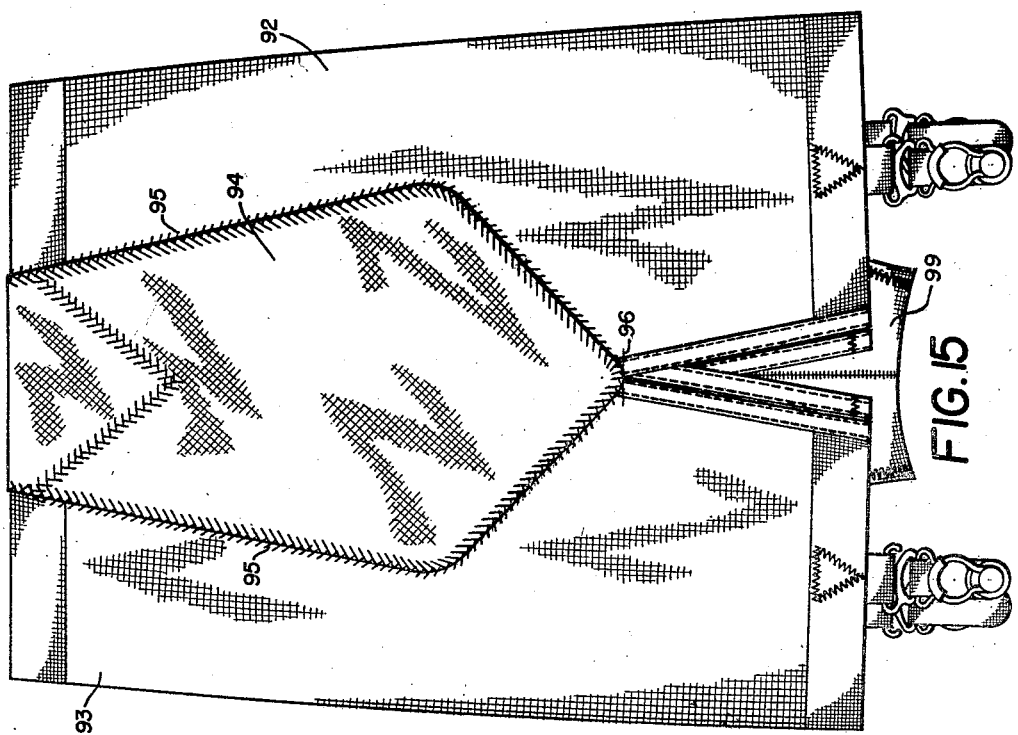
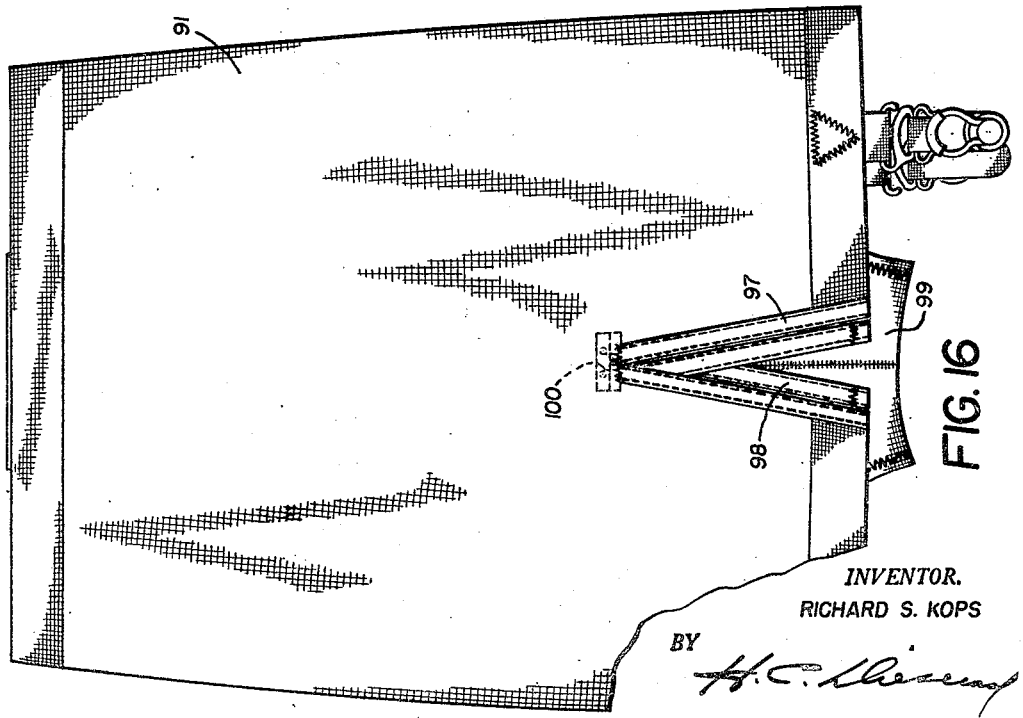

Jan. 11, 1949.  R. S. KOPS  2,458,712
CONVERTIBLE FOUNDATION GARMENT
Filed June 26, 1948  7 Sheets-Sheet 7

INVENTOR.
RICHARD S. KOPS
BY
ATTORNEY

Patented Jan. 11, 1949

2,458,712

UNITED STATES PATENT OFFICE 2,458,712

CONVERTIBLE FOUNDATION GARMENT

Richard S. Kops, Scarsdale, N. Y., assignor to Kops Bros., Inc., New York, N. Y., a corporation of New York Application June 26, 1948, Serial No. 35,481

7 Claims. (Cl. 2—43)

This invention relates to a foundation garment adapted to confine and mold the body of the wearer in the region between the waistline and a point below the buttocks of the wearer.

An object of the invention has been to provide a garment of the character indicated which is normally adapted for use as a conventional girdle, with the usual body confining and molding action, but which may be simply and effectively converted into a pantie girdle, having all of the functions and capabilities of this type of foundation garment. The improved convertible garment is adapted normally for use as a girdle provided with garter attachments, and the like, to be worn in conjunction with an evening gown or a dress or skirt. It may, however, be readily converted for use with sportswear, such as slacks or shorts, and when so converted is adapted to confine the abdomen and hips of the wearer without interference with or by the crotch member of such attire.

Another object of the invention has been to provide a convertible garment of the character indicated which does not in any way sacrifice the confining and molding properties of a girdle or a pantie girdle, depending upon the form in which it is used.

A further object has been to provide a convertible garment of the character indicated which provides the full confining action and smooth lines of a conventional girdle, when arranged for that purpose, and wich provides the desired freedom of action and accommodation of shorts, slacks and the like, with the full confining action of a pantie girdle, when modified for that purpose.

Toward the foregoing ends, a feature of the invention is the provision of a detachable crotch piece which when inserted converts the garment into a regular, closed crotch pantie girdle and when omitted permits the garment to be used as a regular girdle.

Another feature is the provision of one or more sets of complementary fastening elements permanently attached to the garment and which may be, directly or indirectly, interconnected to provide the desired molding and confining action when the garment is to be worn as a regular girdle and which may cooperate with similar fastening elements on a detachable crotch-piece when the garment is to be used as a pantie girdle.

Other objects, features and advantages of the invention will appear from the following detailed description of several illustrative embodiments thereof which will now be given in conjunction with the accompanying drawings, in which:

Fig. 1 is a front view of a preferred form of garment embodying the invention;

Fig. 2 is a back view of said garment;

Fig. 3 is a fragmentary view showing in greater detail the detachable connection of the crotch piece of the garment;

Fig. 4 is a fragmentary view showing portions of the garment detachably inter-connected to form it into a regular girdle;

Fig. 5 is a detail view of the detachable crotch piece;

Fig. 6 is a detail view showing a detachable garter element of a type embodied in the garment;

Figs. 13 and 14 are front and back views, respectively, of a further modified form of garment embodying the features of the invention;

Figs. 15 and 16 are front and back views, respectively, of another modified form of garment embodying features of the invention.

Figure 7:
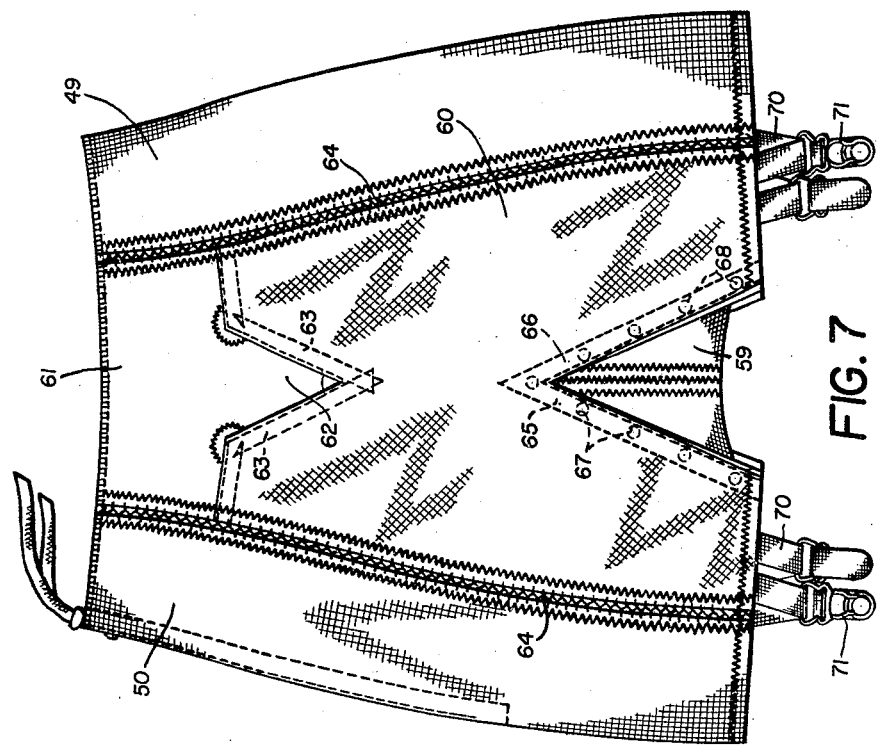
Fig. 7 is a back view of a modified form of garment embodying features of the invention.
Figure 8:
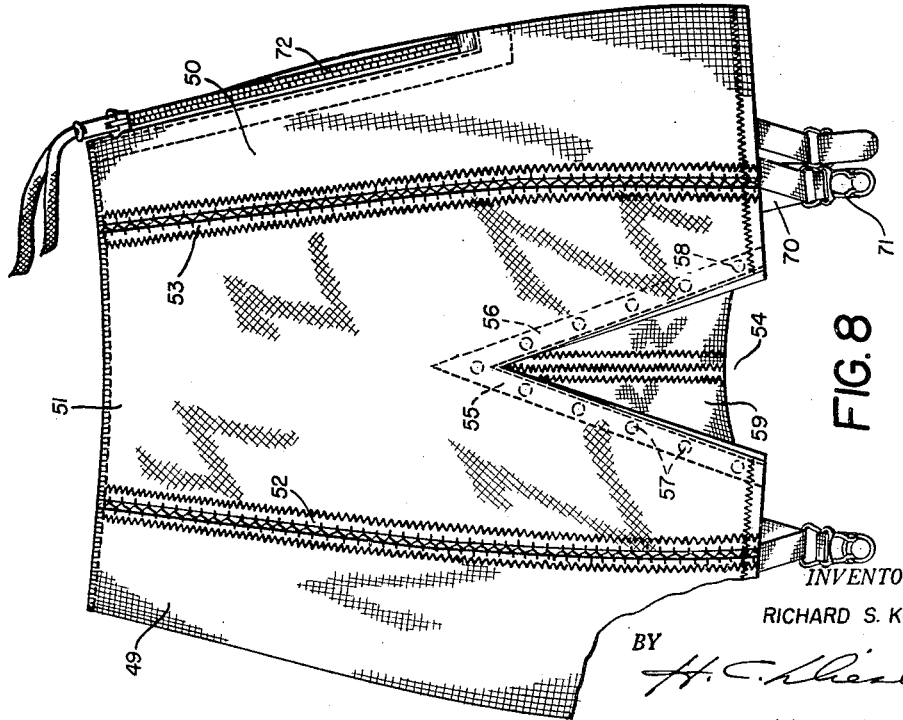
Fig. 8 is a front view of the modified garment.

Referring now to Figs. 1 to 6, inclusive, illustrating the first embodiment of the invention, there is shown a body-confining member adapted to encircle the body of the wearer from a point at or slightly above the waistline to a point below the buttocks. This member may comprise an elastic section 10 extending from substantially the center of the front of the garment, around the left side of the wearer, to substantially the center of the back of the garment. A similar section 11 extends from substantially the center of the front, around the right side of the wearer, to substantially the center of the back of the garment. The sections 10 and 11 may suitably be formed of either one-way or two-way elastic fabric and extend from top to bottom thereof. They have elasticity at least in a transverse direction so as to provide a firm confining action around the body of the wearer. At the front of the garment a panel 12 is provided, this being stitched to the section 10 along a curved seam line 13 and to the section 11 along a curved seam line 14. The lines of stitching 13 and 14 converge at a point 15, at the bottom of the panel, which is about one-third or one-fourth of the way up from the lower edge of the garment and along the vertical center-line of the front portion thereof. Panel 12 may be formed either of non-elastic material or of one-way stretch material having elasticity in a vertical direction. At the back of the garment a panel 16 is provided of somewhat the same configuration as the panel 12 but preferably slightly larger. This is attached to the section 10 along a curved line of stitching 17 and to the section 11 along a curved line of stitching 18. These lines of stitching converge at a point 19, at the lower end of the panel, which is about one-fourth of the way up from the lower edge of the back portion of the garment along the vertical center line thereof. Panel 16 preferably has one-way elasticity, permitting a vertical stretch, to compensate for lengthening of the corresponding dimension of the wearer upon assuming a sitting posture. A downward pull at the waistline of the garment is thus avoided.

Below the point 15, at which the sections 10 and 11 are brought together and firmly united, these sections are arranged to provide an opening, in the nature of a slit, extending from the lower edge of the garment to the point 15. Along the free edge of section 10, thus provided, is a tape 20 (Figs. 1 and 3) carrying a series of fastening elements, such as eyelets 22. Similarly, along the free edge of section 11 there is provided a tape 21 carrying a series of complementary fastening elements, such as hooks 23. These hooks and eyes are adapted to be interconnected, as shown in Fig. 4, to close the opening and transmit the tension from section 10 to section 11, thereby providing a firm confining action across the hips and thighs of the wearer in the manner of a regular girdle. In a similar way the sections 10 and 11 come together and are firmly attached to the lower end of panel 16 at the point 19, below which an opening or slit is provided to the lower edge of the garment. The free edge of section 10 at the rear of the garment is provided with a tape 24 carrying a series of fastening elements, such as eyelets, while the free edge of section 11 is provided with a tape 25 carrying a series of complementary fastening elements, such as hooks. These hooks and eyes may be interconnected to close the opening and transmit the tension from one section to the other, thereby providing a firm confining action across the hips and thighs, as explained above.

The top and bottom edges of the garment may be finished in any suitable way. At the top there may, for example, be provided an elastic tape 26 extending from one edge of the panel 12 completely around the side and back portions of the garment to the opposite edge of the panel 12. The panel 12 may be provided at its top with a hem 27. Similarly, the lower edge of the garment may be provided with elastic tapes 28, extending from the lower ends of the tapes 20 and 21, around the sides of the garment, to the lower ends of the tapes 24 and 25, at the back of the garment. Elastic garter straps 29 may be secured to the lower edges of the front and back portions of the garment at suitable points, each of these being adapted to receive a detachable garter member 30 of any suitable construction. The upper ends of these garter attachments are preferably slotted, as indicated at 31 in Fig. 6, to permit ready attachment and detachment in relation to the straps. Stays 32 may be provided, if desired, at the front of the garment to assist in confining the abdomen. Similar stays may also be provided at the back, if desired. These stays, it will be understood, may be suitably attached by means of tapes applied to the inner face of the garment, in the conventional manner. At the left side of the garment an opening may be provided from the upper edge to a point about midway between the top and bottom edges of the garment. This opening is preferably arranged to be closed by a hookless fastener of the slide fastener type, as indicated at 33. Supplementary hook and eye fasteners may also be employed, if desired. A rider 34, having a ribbon 35 attached thereto, will serve to close the garment after it has been applied. This arrangement provides a semi-step-in type of garment. If desired the invention may be applied to a full step-in type of garment with no side opennig. Or the garment may have a full side opening from top to bottom arranged to be closed and fastened in any of the usual ways.

When it is desired to convert the garment from its regular girdle form, indicated in Fig. 4, to a pantie girdle, the hooks and eyes 22 and 23 and those on the tabs 24 and 25 will be disconnected and a crotch piece of the type illustrated in Fig. 5 will be inserted. This crotch piece is preferably formed of two sections 36 and 37, each having substantially a trapezoidal configuration, sections being stitched together along their longer edges by a seam 38. The shorter, parallel edges of the sections are preferably hemstitched, as indicated at 39 and 40, or the crotch piece may be made of double ply material. The material of which the crotch piece is formed is preferably non-elastic but of a type having a certain amount of stretch. For this purpose it may suitably be formed of a jersey-type material or tricot or malines, although any other suitable material may be employed. Along one of the inclined edges of the section 36 there is secured a tape 41 carrying a series of fastening elements, such as eyes 42, having the same spacing as the eyes 22. Similarly, along the corresponding edge of section 37 there is provided a tape 43 carrying a series of complementary fastening elements, such as hooks 44, having the same spacing as the hooks 23. Along the opposite edges of the two sections are provided tapes 45 and 47 carrying eyes 46 and hooks 48, respectively. When the garment is to be used as a pantie girdle, the hooks 44 will be connected with the eyes 22 and the hooks 23 will be engaged with the eyes 42. Correspondingly, the hooks 48 and eyes 46 will be connected with the eyes and hooks carried by the tapes 24 and 25. The crotch piece will then provide a closed crotch for the garment and produce the effect illustrated in Figs. 1 and 2. As shown in Fig. 5, the hook and eye carrying the tapes at each end of the crotch piece form a point with an angle of about 90°. A certain amount of fullness is provided along the sides of the crotch piece to form leg portions adapted to extend around the inner portions of the thighs.

It will be noted that the various eyes are backed by a relatively broad tape which serves to protect the wearer against any harmful cutting or rubbing action of the hook elements in both arrangements of the garment. Also, it will be noted that the hooks are provided at both ends of section 37 and eyelets are provided at both ends of section 36. This facilitates manufacture of the crotch piece but it requires the insertion of it in a definite way in the garment. If desired it could be made reversible by interchanging the eyelets 43 and hooks 48 with a corresponding interchange of the hooks and eyes at the back of the garment. When this is done the openings at the front and back of the garment should be made of the same extent.

In Figs. 7 to 12, inclusive, a modified construction embodying certain of the features of the invention is illustrated. The girdle here shown comprises a body-encircling member having side sections 49 and 50 formed of transversely elastic material which may also, if desired, have a certain amount of vertical elasticity. These sections are secured to a full length front panel 51, formed preferably of vertically elastic material, by lines of stitching 52 and 53. At the bottom of the panel 51, and centrally thereof, a V-shaped opening 54 is provided, the edges of the opening being suitably reinforced by tapes 55 and 56 carrying spaced fastening means of any suitable character. As illustrated, the garment is provided with snap fastening elements 57 and 58, but these may be replaced by hooks or eyes or by one set of each or by other fastening means. The elements 57 and 58 are adapted to receive complemental snap fastening elements on a detachable crotch piece 59 which may suitably be of substantially the same configuration as the crotch piece shown in Fig. 5, although it is preferably substantially wider and somewhat longer. One of the fastening elements is preferably provided at the apex of the angle formed at each end of the crotch piece. The back of the modified garment comprises a lower panel 60 of vertically elastic material and an upper section or band 61 of transversely elastic material. The band may be provided with a downwardly extending, V-shaped portion 62 stitched to the edges of a corresponding opening in the top of panel 60 by lines of stitching 63. This arrangement is similar to that disclosed in the Kops Patent No. 2,169,585, granted on August 15, 1939. Panel 60 and band 61 may be secured to the side panels 49 and 50 by suitable lines of stitching 64. At the center of the bottom of the panel 60 a V-shaped opening is provided, the edges of which are reinforced by suitable tapes 65 and 66 carrying spaced fastening elements, such as snap fasteners 67 and 68. These permit the attachment of the other end of the crotch piece 59 to complete the closed-crotch pantie girdle effect. At the lower edge of the garment, elastic garter straps and detachable garter members 71 are provided at appropriate points. When the garment is employed as a pantie girdle the members 71 will normally be detached. A side opening, adapted to be closed by a slide fastener 72, may be provided in the panel 50 to create a semi-step-in type of garment, or a full opening may be provided here, if desired. Suitable fastening means for closing the garment will, of course, be provided in that event.

Figure 10:
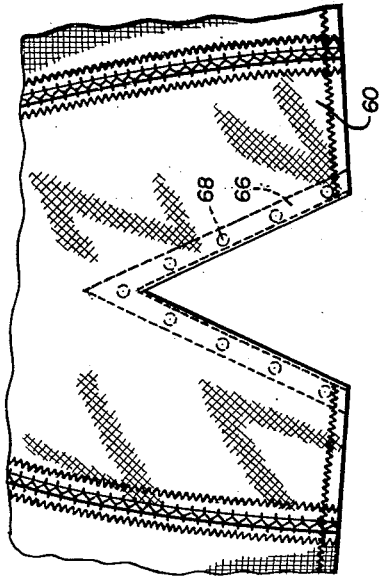
Fig. 10 is a similar fragmentary view showing the crotch piece completely detached.
Figure 12:
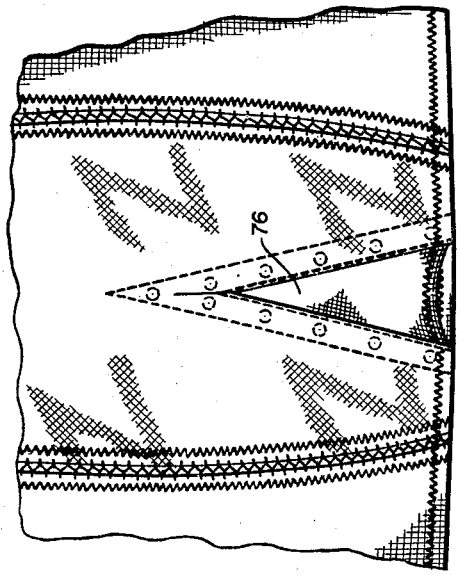
Fig. 12 is a corresponding view of the lower portion of the front of the modified garment.
Figure 9:
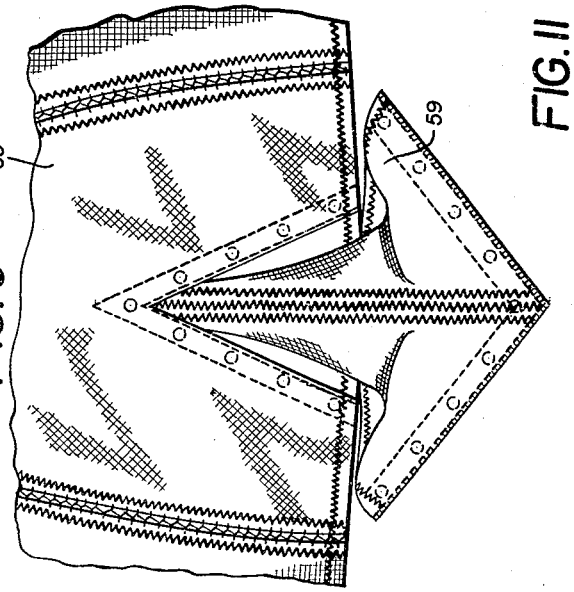
Fig. 9 is a fragmentary view showing the lower portion of the modified garment with the crotch piece partially detached.
Figure 11:
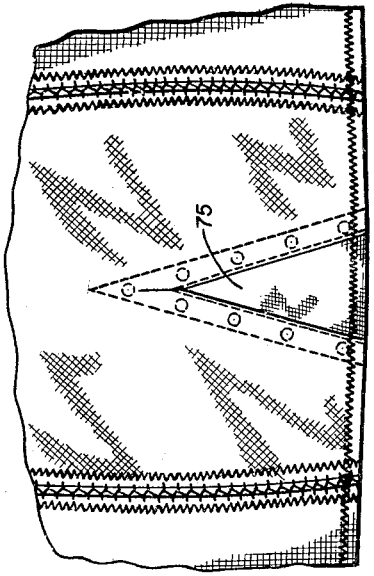
Fig. 11 is a fragmentary view of the lower portion of the back of the garment with an insert, provided when the garment is to be worn as a regular girdle.

When it is desired to convert this modified form of garment into a regular girdle, the crotch piece is detached, as indicated in Figs. 9 and 10. Fig. 9 shows it detached from one panel of the garment, while Fig. 10 shows it completely removed. Now, since the openings in the lower edges of the panels 51 and 60 are of such a configuration that the free edges cannot be directly interconnected, detachable triangular sections or inserts 75 and 76 are provided for the rear and front panels, respectively. These triangular inserts are preferably formed of transversely elastic material, thereby serving as gores, and are provided with fastening elements adapted to cooperate with the fastening elements 57, 58, 67, and 68 at the edges of the openings. When so attached, as shown in Figs. 11 and 12, the garment will exert a firm confining force across the hips and thighs of the wearer.

In Figs. 13 and 14 another embodiment is shown. In this, the body encircling member is formed largely of two-way stretch material which may suitably be of either woven or knit construction. This girdle may readily be made of the step-in type. It comprises a main section 77 of two-way stretch knit fabric which extends around each side of the wearer and across the back. At the front, a panel 78 is provided which may be either of non-elastic material or one-way stretch material having vertical elasticity. This is permanently connected with one edge of the section 77 by lines of stitching 79 and to the opposite edge of section 77 by lines of stitching 80. A slit or opening extending upwardly from the center of the lower edge of panel 78 for a distance of about one-third the height of the garment has its edges suitably bound or reinforced by tapes 81 and 82. The latter are merged at the top of the opening and are firmly secured by heavy cross-stitiching 83 which prevents tearing of the material above this point. The reinforcing tape 81 may suitably carry eyelets while the tape 82 may carry hooks by means of which the opening may be closed when desired by simply interconnecting the hooks and eyes. Other fastening means may, of course, be employed in lieu of the hooks and eyes. A regular girdle of the two-way stretch type is provided upon the interconnection of the fastening elements.

When it is desired to convert this girdle into a pantie girdle the fastening elements of the tapes 81 and 82 are disconnected from each other and a crotch-piece 84 is inserted in the opening. This crotch piece may have one end formed in the same manner as one of the ends of the crotch-piece shown in Fig. 5. Preferably, however, it has an additional hook provided directly along the seam 38 at substantially the end thereof for attachment to an eyelet 85 carried by a small section of tape 86 suitably stitched to the inner surface of the panel 78. The other end of the crotch-piece 84 may suitably narrow down, as indicated at 87 in Fig. 14, to a width of about an inch and this end may be provided with a pair of hooks adapted to cooperate with eyelets 88 secured by a small section of tape 89 to the inner face of the back portion of the garment, adjacent its lower edge. Suitable garter attachments 90 may be provided in the manner hereinabove described, whenever the garment is to be worn as a regular girdle.

The two-way stretch garment described above may, if desired, be modified by the inclusion of a panel, similar to the panel 78, in the back portion of the garment. If this is done and a slit or opening is provided at the back as well as at the front, a crotch piece of the type shown in Fig. 5 may be employed.

Figs. 15 and 16 illustrate a further embodiment of the invention which may suitably be of the two-way stretch type. In this, the body-encircling member may be formed primarily of knit, two-way elastic material which extends substantially completely around the wearer. It may suitably be formed of a back section 91 and two front sections 92 and 93 which are secured by stitching to the back section at the side edges of the garment. At the front of the garment a panel 94 is provided which may be either non-elastic or simply elastic in a vertical direction. This panel is secured to the edges of sections 92 and 93 by lines of stitching 95. These lines of stitching suitably converge toward a point at the lower end of the panel 94, and immediately below this point a transversely extending line of stitching 96 serves to tack the several sections firmly together. Below the line of stitching 96 the edges of members 92 and 93 are free and thus provide a vertically extending slit from the lower edge of the garment up to this point. These free edges are suitably bound and the binding tapes are included in the stitching 96. Complementary fastening means, such as hooks and eyes, may be provided on tapes secured along the two free edges to permit these to be fastened together when the garment is worn as a regular girdle.

The back of the garment may be of similar construction, if desired, but it is illustrated as being formed entirely by the two-way stretch section 91. This is simply provided with a slit extending upwardly from its lower edge for a distance of about one-fourth or one-third the length of the garment. The free edges formed by the slit are appropriately bound. A tape 97, carrying fastening means such as eyelets, is provided along one edge of the slit and a tape 98, carrying complementary fastening elements such as hooks, is provided along the other edge of the slit. These fastening means may be directly interconnected when the garment is to be worn as a regular girdle.

When it is desired to convert the garment into a pantie girdle, the hooks and eyes at the front and back of the garment may be disconnected and corresponding hooks and eyes provided on a crotch-piece 99, similar to that shown in Fig. 5, may be attached to the free edges of the opening. Preferably, a hook is provided at each end of the crotch-piece, along the seam line 38 of Fig. 5, and these hooks are adapted to be fastened into eyelets provided at 95 and 100.

Figure 17:
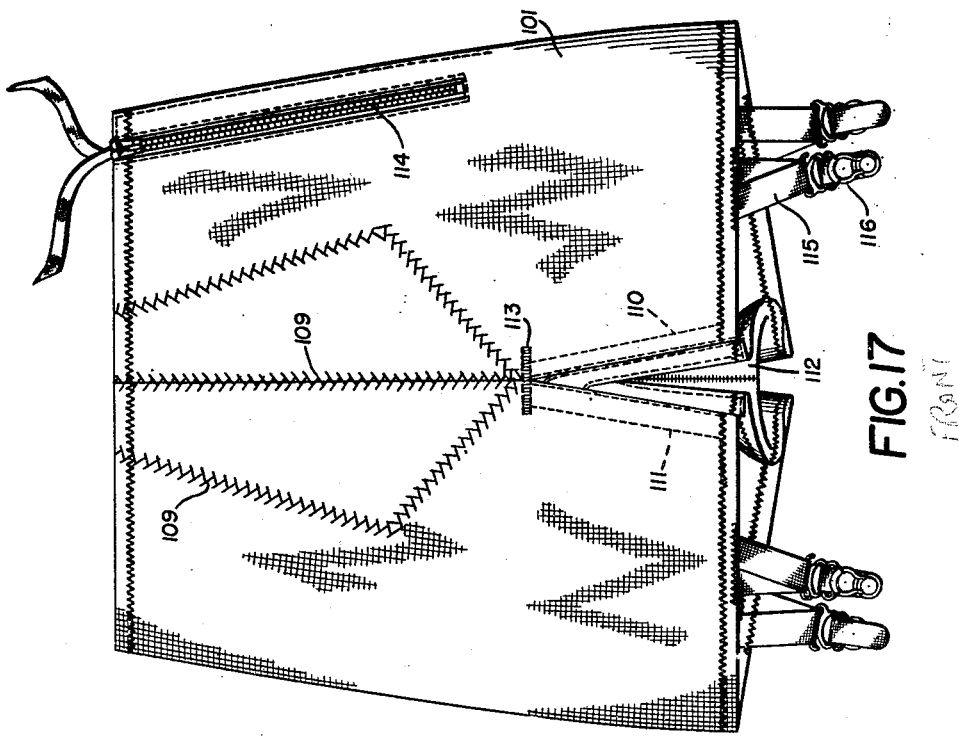
Figs. 17 and 18 are front and back views, respectively, of a still further modified form of garment embodying features of the invention.
Figure 18:
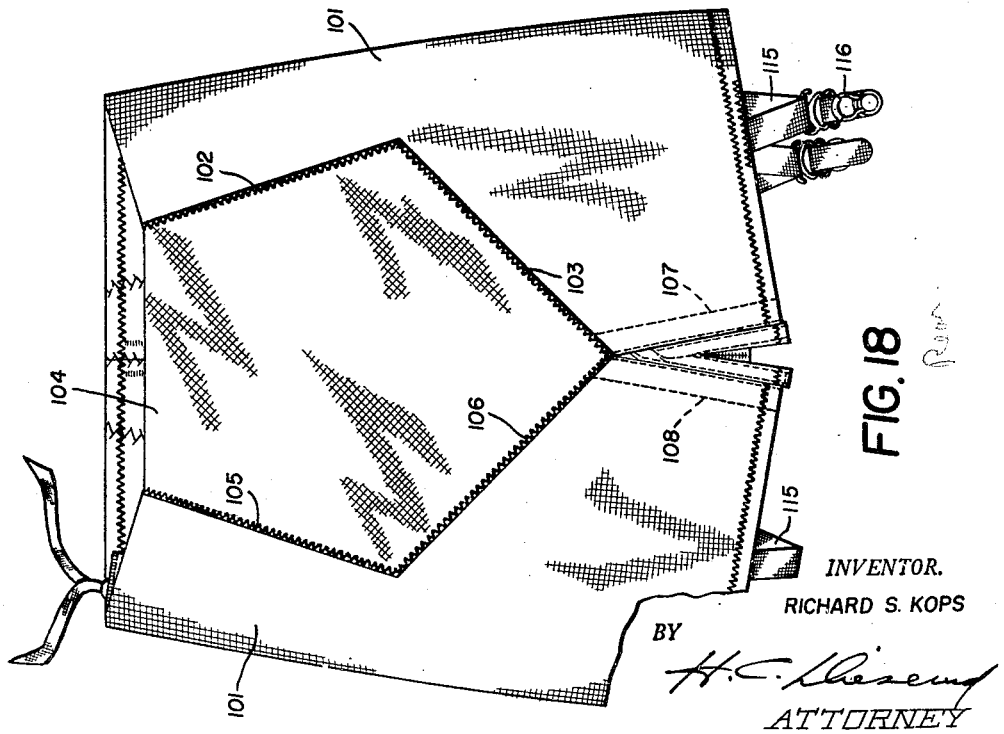

Turning now to Figs. 17 and 18, there is shown a form of garment quite similar to that of Figs. 1 to 6 but which has a single member 101 formed of one-way elastic material extending completely across the front of the wearer and round the sides of the wearer and partially across the back. This member 101 has one edge stitched along heavy seam lines 102 and 103 to corresponding edges of of a back panel 104. The opposite edge of member 101 is stitched along seam lines 105 and 106 to the opposite edge of panel 104. The latter may be formed of one-way elastic material arranged to stretch vertically. Below the lower pointed end of the panel 104, the end edges of member 101 are free but are provided with tapes 107 and 108 carrying complementary fastening elements, such as hooks and eyes. When these are interconnected the garment is adapted to provide a firm confining force across the hips and thighs in the manner of a regular girdle. The front of the garment shown in Fig. 17 is provided with stitching 109 simply for ornamental purposes. Member 101 is provided with a slit or opening at it bottom extending from its lower edge for a distance of about one-third the length of the garment. Reinforcing tapes 110 and 111 at the edges of the slit or opening are provided with complementary fastening elements, such as hooks and eyes, adapted to be interconnected when the garment is worn as a regular girdle. When these fastening elements are disconnected, along with those carried by the tapes 107 and 108, a detachable crotch-piece 112, similar to that shown in Fig. 5, may be inserted to convert the garment into a pantie girdle. A transverse line of stitching 113 is provided at the upper end of the slit or opening in the front of the garment to prevent tearing of the fabric. A side opening, adapted to be closed by a slide fastener 114, is preferably provided to produce a semi-step-in type of garment. Garter straps 115 and detachable garter elements 116 may be provided as in the other embodiments.

While a number of illustrative embodiments of the invention have been disclosed in considerable detail to indicate a variety of possible constructions, it will be understood that various other changes in the form and arrangement of the several parts may be made without departing from the general principles and scope of the invention. Features described in relation to one embodiment may be employed in connection with the others. For example, the transversely elastic band shown at 61 in Fig. 7, with its V-shaped downward extension 62, may be provided in the back panel of other garments, such as that illustrated in Fig. 2. Wherever reference is made to specific fastening means such as hooks and eyes or snap fasteners, it will be understood that any suitable form of fastening may be substituted. For example, a detachable type of slide fastener may be employed. It is primarily important that the fastening means be so selected that complementary elements will be provided at the various edges which must be united under the different conditions.

While the openings which permit detachable connection of the crotch piece have been described as preferably extending between ¼ and ⅓ of the length of the garment, they may be of either greater or lesser extent depending upon the form of the crotch piece and the general arrangement provided. Also, while the invention has been disclosed in connection with a garment of the girdle type, it may, if desired, be employed in connection with a combination garment having a brassière portion in addition to the girdle portion.

With regard to the crotch piece, it should be noted that an advantageous feature of the invention is the possibility of providing crotch pieces in graded sizes. Thus in the purchase of a garment of a particular size, it is possible to select any one of a number of crotch pieces of different sizes to be embodied in the garment. The detachability of the crotch pieces makes this readily possible. As a result, the improved garment may be specially adapted to a variety of different figures, both with respect to its use as a regular girdle and with respect to its use as a pantie girdle.

Referring particularly to the form of garment illustrated in Figs. 13 and 14, it will be understood that the shape of the crotch piece may be varied substantially. In lieu of tapering toward a relatively small dimension at the end which is attached to the back portion of the garment, the crotch piece may be made relatively broad at this end, if desired. This rearward end of the crotch piece may suitably vary between 1 and 5" in width. If it is made wider than illustrated, a greater number of hooks and eyes, or other fastening elements, should be provided for attachment of it to the lower edge of the back portion of the garment.

In the production of the various parts of the several garments, any of the materials commonly employed for similar purposes may be used. Modifications or changes, other than those herein expressly suggested, will occur to those skilled in the art.

What I claim is:

1. A foundation garment comprising a body encircling member having transversely elastic portions arranged to exert a body confining action, said member extending from the waistline of the wearer to a point below the buttocks, said member having an opening extending upwardly from the lower edge thereof at the center of the front portion of said member to an apex at a point intermediate the top and bottom edges of the member, said portion of said member being permanently connected above said point, complementary means at the edges of said opening for detachably interconnecting the same to provide a confining action across the thighs of the wearer, and a detachable crotch piece having similar complementary fastening means adapted to be connected with the edges of said opening, when they are not interconnected, to form said garment into a pantie girdle, said crotch piece and the back portion of said member having means for detachably connecting said crotch piece to the lower part of the back portion of said member.

2. A foundation garment comprising a body encircling member having transversely elastic portions arranged to exert a body confining action, said member extending from the waistline of the wearer to a point below the buttocks, said member having an opening extending upwardly from the lower edge thereof at the center of each of the front and back portions of said member to points intermediate the top and bottom edges of the member, said portions of said member being permanently connected above said points, complementary means at the edges of each of said openings for detachably interconnecting the same to provide a firm confining action across the thighs of the wearer, and a detachable crotch piece having similar complementary fastening means adapted to be connected with the edges of said openings, when they are not interconnected, to form said garment into a pantie girdle.

3. A foundation garment comprising a body encircling member having transversely elastic portions arranged to exert a body confining action, said member extending from the waistline of the wearer to a point below the buttocks, said member having an opening extending upwardly from the lower edge thereof at the center of each of the front and back portions of said member to points intermediate the top and bottom edges of the member, said portions of said member being permanently connected above said points, complementary means at the edges of each of said openings for detachably interconnecting the same to provide a firm confining action across the thighs of the wearer, and a detachable crotch piece having similar complementary fastening means adapted to be connected with the edges of said openings, when they are not interconnected, to form said garment into a pantie girdle, said crotch piece being formed of two like trapezoidal sections joined by stitching along the longer of their parallel edges and having fastening elements complementary to said means at the edges of said openings along the non-parallel edges of said trapezoidal sections.

4. A foundation garment comprising a body encircling member having transversely elastic portions arranged to exert a body confining action, said member extending from the waistline of the wearer to a point below the buttocks, said member having a slit extending upward from the lower edge thereof at the centers of the front and back portions of said member to points intermediate the top and bottom edges of said member, the free edges formed by each slit having complementary fastening means secured thereto, said fastening means comprising hooks at one edge and eyes at the other edge of each slit, said fastening means at each slit being adapted to be interconnected to provide a continuous section across the body of the wearer to provide a firm confining action in the region of the hips, and a detachable crotch piece having similar complementary fastening means adapted to be secured to the edges of said slits, when they are not interconnected, to convert said garment into a pantie girdle.

5. A foundation garment comprising a body encircling member adapted to serve as a girdle extending from the waistline of the wearer to a point below the buttocks, said member comprising a pair of horizontally elastic sections having the lower portions thereof extending from the center of the front to the center of the back of said member, said sections having an elastic confining action around the body of the wearer, said portions having free end edges, complementary fastening means at said edges of said portions, of said sections for detachably connecting the same, inserts which are non-elastic in a direction around the body permanently secured to said sections above said portions, the upper ends of said portions being firmly anchored to the bottoms of said inserts, and a detachable crotch piece having different sets of complementary fastening means adapted for connection with the edges of said portions when the latter are not interconnected, to convert said garment into a pantie girdle.

6. A foundation garment comprising a body encircling member adapted to serve as a girdle extending from the waistline of the wearer to a point below the buttocks, said member comprising a pair of horizontally elastic sections having the lower portions thereof extending from the center of the front to the center of the back of said member, said sections having an elastic confining action around the body of the wearer, said portions having free end edges, means for detachably connecting said edges of said portions of said sections, said means comprising eyelets at one edge and hooks at the other edge of said portions at both the front and back of said member, inserts which are non-elastic in a direction around the body permanently secured to said sections above said portions, the upper ends of said portions being firmly anchored to the bottoms of said inserts, and a detachable crotch piece having hooks and eyelets adapted for connection with the hooks and eyelets at said edges of said portions when the latter are not interconnected to convert said garment into a pantie girdle.

7. A foundation garment comprising a body encircling member adapted to serve as a girdle extending from the waistline of the wearer to a point below the buttocks, said member being formed of two-way elastic material, slits extending upwardly from the lower edge of said member at substantially the centers of the front and rear thereof to a point intermediate the top and bottom edges of said member, each of said slits providing an opening having an apex at said point, means at the upper ends of said slits for firmly and permanently anchoring the tops of the free edges thereof, complementary fastening means for detachably interconnecting said free edges at both the front and back of said member to provide a firm confining force around the hips, and a crotch piece having fastening means complementary to those at said edges adapted for detachable connection with said free edges, when they are not interconnected, for converting said garment into a pantie girdle.

RICHARD S. KOPS.

REFERENCES CITED

The following references are of record in the file of this patent:

UNITED STATES PATENTS

| Number | Name | Date |
| --- | --- | --- |
| 2,070,515 | Miller, Jr, et al. | Feb. 9, 1937 |
| 2,074,975 | Baatz | Mar. 23, 1937 |
| 2,193,171 | Gross | Mar. 12, 1940 |
| 2,382,477 | Goodman et al. | Aug. 14, 1945 |